Aug. 15, 1950  F. M. SLOUGH  2,518,826
FRICTION DRIVE MECHANISM FOR PHONOGRAPH TURNTABLES
Original Filed Oct. 13, 1948  2 Sheets-Sheet 1

Frank M. Slough, INVENTOR.
BY Slough & Slough,
His Attorneys.

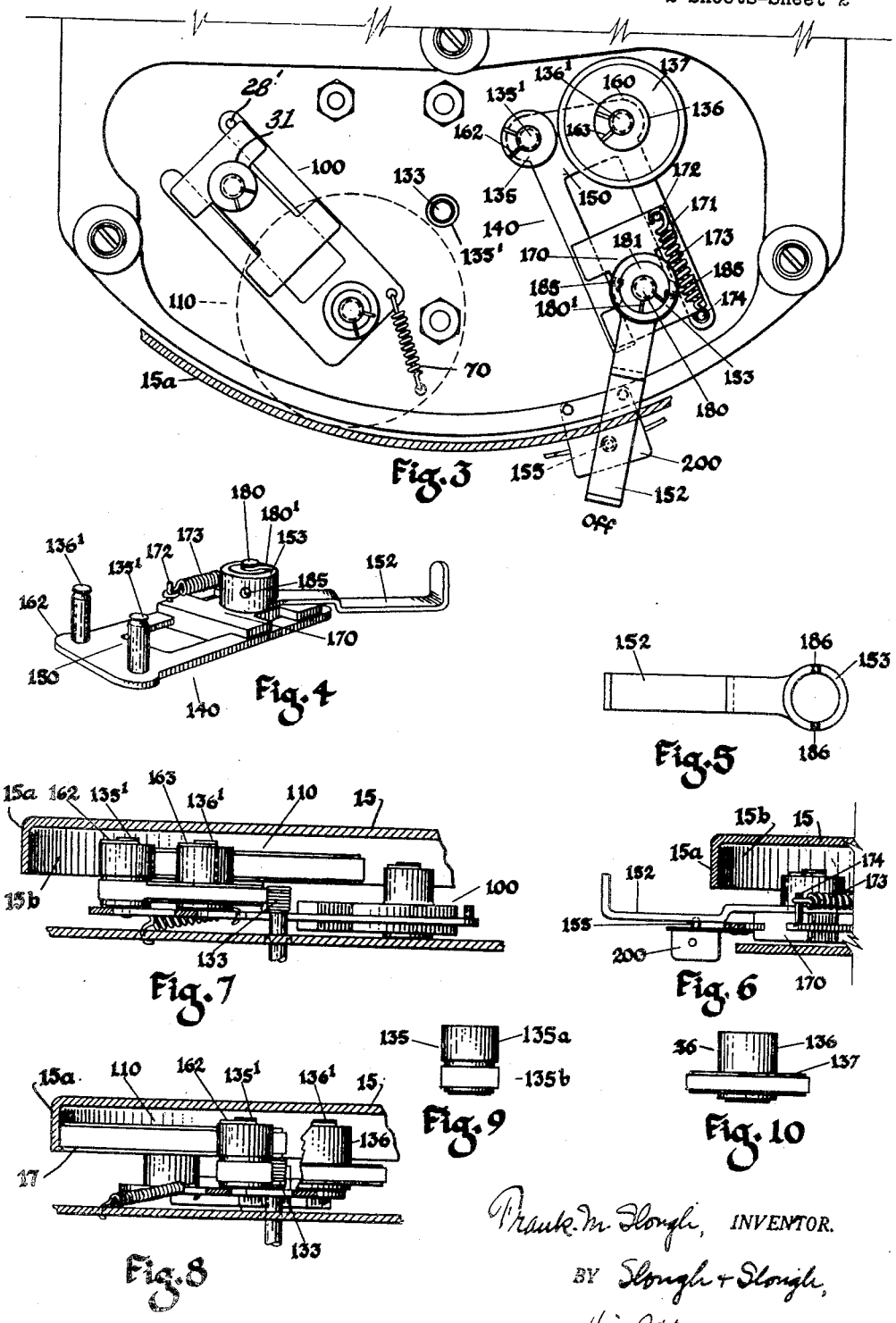

Patented Aug. 15, 1950

2,518,826

UNITED STATES PATENT OFFICE 2,518,826

FRICTION DRIVE MECHANISM FOR PHONOGRAPH TURNTABLES

Frank M. Slough, Lakewood, Ohio, assignor to The General Industries Company, Elyria, Ohio, a corporation of Ohio Original application October 13, 1948, Serial No. 54,246. Divided and this application February 17, 1950, Serial No. 144,840

13 Claims. (Cl. 74—199)

My invention relates to a plural-speed friction drive mechanism for phonograph turntables, and more particularly relates to unitary adjustable friction gearing therefor, whereby a motor shaft portion thereof may drive such a turntable at selectively different rotational speeds.

This application is a divisional of my co-pending application for United States Letters Patent, filed October 13, 1948, bearing Serial No. 54,246, which relates to "Two-Speed Friction Drive Transmission for Phonograph Turntables."

My invention involves an improvement over prior friction drive mechanisms with which I am familiar, in that the final drive wheel of the mechanism of my invention is not required to be disposed at different levels which requirement would involve the necessity of providing a more expensive turntable having a wider peripheral flange to be engaged by such a wheel.

My invention also involves further improvements, in that only a single pulley portion of a motor shaft is required, and that no thin belts or the like which are required to be finished to precise dimensions and are therefore expensive to produce as well as expensive to maintain are required.

An object of my invention is to provide an improved friction drive mechanism wherein any of a plurality of pulley elements, each having upper and lower portions of diametrically different ratios from any other thereof, may be selectively disposed between a peripheral portion of the final drive wheel of the mechanism and a relatively lower pulley portion of a motor shaft, with which said upper pulley portion and said lower pulley portion of the selected pulley element are thereby peripherally engaged.

Another object of my invention is to provide a plural-speed friction driving mechanism for phonograph turntables which is simple and inexpensive in construction, and reliable in use.

Other objects of my invention, and the invention itself, will be readily understood by those skilled in the art to which my invention appertains, by reference to the following written description of a preferred embodiment of my invention wherein reference is had to the following drawings, whereof:

Fig. 3 is a view of the nature of that of Fig. 2, showing said operative parts and said lever in a third adjustment position.

Fig. 4 is a perspective view of an adjustably rotatable, and longitudinally extensible mount for a pair of idler pulley journal posts and showing the speed adjustment lever of the mechanism.

Fig. 5 is a top plan view of the lever of Fig. 4.

Fig. 6 is a side elevational view of the lever of Fig. 4.

Fig. 7 is a side elevational view taken along the line 16—16 of Fig. 1.

Fig. 8 is a view similar to Fig. 7 but taken along the line 17—17 of Fig. 2.

Fig. 9 is a side elevational view of one of the idler pulleys which is operative to effect driving of the turntable at a relatively high speed, and Fig. 10 is a side elevational view of another idler pulley which is operative to effect driving of the turntable at a lower speed than is the pulley of Fig. 9.

Figure 1:
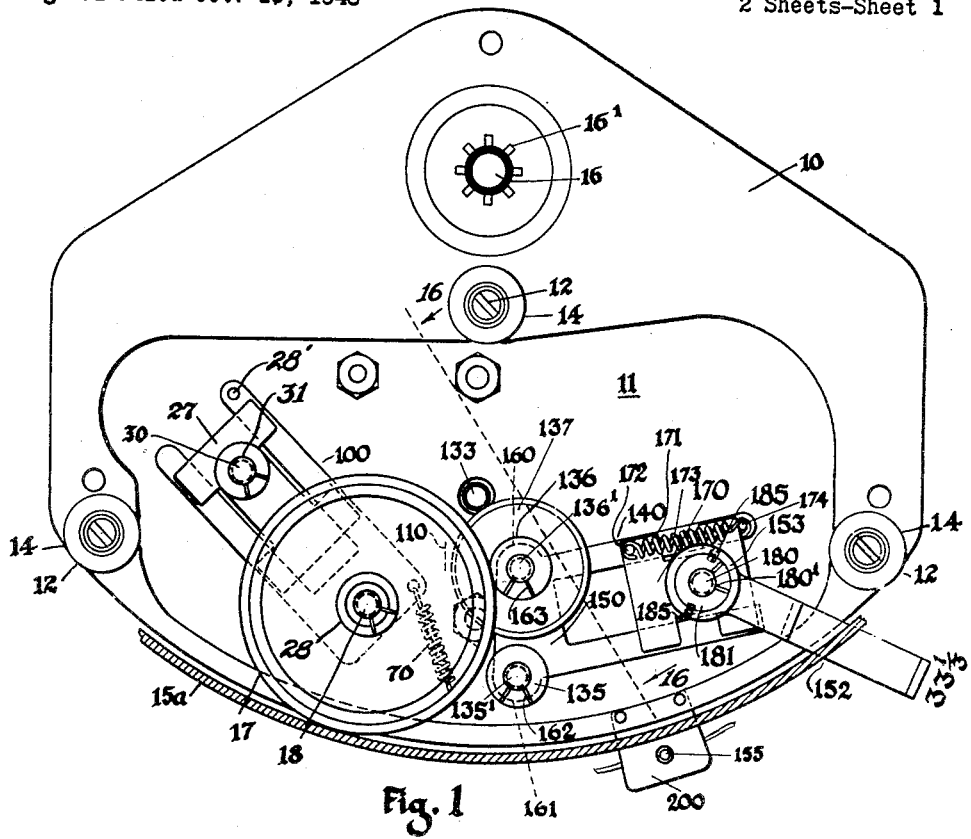
Figure 1 is a top plan view of a unitary assembly of the elements of the preferred form of my invention, a turntable supporting platform and a peripheral segment of the turntable flange, the latter in horizontal section being also shown in association therewith.

Referring now to the drawings, which illustrate a preferred embodiment of my invention, the main supporting plate 10 upon which a turntable 15, is supported, is usually of sheet metal, and a supplemental plate 11, which carries all parts of the mechanism for driving the turntable, is pendantly removably supported from the main plate by three machine screws 12 thereby affording a three point suspension for the plate 11, said mounting screws being insulated from metallic contact with the plates 10 and 11, by rubber spacer elements, or grommets 14 in accord with present day common practice.

The turntable 15 may be carried on the post 16 in any well known manner and preferably the post is journalled in a bearing 16', carried by the main plate 10, for free frictionless rotation. The turntable is provided with a pendant peripheral flange 15a preferably having a smooth cylindrical surface 15b with which the rubber peripheral tread 17 of the friction wheel 110 is adapted to be frictionally engaged, whereby rotation of the friction wheel may drive the turntable at a speed determined by the peripheral speed of the said wheel.

The hub of the wheel 110 is journalled on an upstanding post 18, said post being fixed by its lower end to a yoke portion 19 of a floating U-shaped slide plate 100, said slide being provided with a pair of parallel arms 21 and 22 which make bearing fitting engagement within slideways afforded by notches in horizontal radially extending flanges 23, 24, 25 and 26 of an I-shaped block 27, said block, slide, and the parts thereof being preferably of the general form of that shown in the prior patent to Hartman, No. 2,421,910, dated June 10, 1947.

The arm 22, of the slide 100 is suitably apertured at 28 to receive the post 18 and an arm 22 is suitably apertured at 28' to receive a vertically extending stop pin 29, which is adapted for engagement with the flange 24 of the block 27 to limit forward movements of the slide. The I-shaped block 27 is journalled, by its bored hub 31, on a vertically disposed post 30 whose lower end is rigidly secured to the mounting plate 11.

The slide 100 which carries the supporting journal post for the wheel 110 is slidably extensible with respect to the block 27, being guided during extension movements by the guiding surfaces of the flange slots which receive the parallel slide arms.

A tension spring 70 secured by its respective ends, to the yoke portion 19 of the slide, and forwardly thereof to the supporting frame 11 of the mechanism, yieldably maintains said slide in such foremost extended position, and in such laterally swung position as required to effect engagement by said wheel tread 17 which is of rubber material, with the inner surface of a pendant annular flange such as at 15a and also interchangeable engagement, as later described, with an upper pulley portion 135a or 136 of one or the other of the axially bored pulleys shown respectively in Fig. 9 at 135, and in Fig. 10 at 36.

The motor, not shown, will be understood to be pendantly so secured to the under side of the common supporting plate 11, whereby its power drive shaft is projected vertically upward through a relatively enlarged aperture 133' of said plate to dispose its upper pulley portion 133 above the plate, at a somewhat lower level than the level of the wheel tread 17.

The upper and lower pulley portions for the pulley element 135 are respectively shown in Fig. 9, at 135a and 135b, and the upper and lower pulley portions of the pulley element 36 are respectively shown in Fig. 10 respectively at 136 and 137, the lower pulley portions of both said elements having annular rubber treads. The greater diameter of the lower pulley portion 137 of the element 36 as compared with the lower pulley portion 135b of the element 135, and the different diameters of the upper pulley portions 135a and 136 of the respective elements 135 and 36, are predetermined in any case, to afford such different driving ratios, whereby the wheel 110 may be driven at predetermined different speeds, by power supplied by the shaft pulley 133 to one or the other of the aforesaid lower pulley tread portions 135b or 137, and delivered to the wheel tread 17, respectively by one or the other of the aforesaid upper pulley portions 135a or 136.

Mounting means for said pulleys 35 and 36 and manually adjustable means for selectively disposing each of said pulleys in its operative and alternatively an inoperative position, will now be described:

At 170, an I-shaped block which is similar to but shorter than the block 27, and similarly having a vertically bored hub 181 is shown as journalled, for lateral swinging movements, by its said hub on a vertical journal post 180, by preferably a snug fit, the lower end of the post being rigidly secured to the frame plate 11, and said block being restrained from upward movement on the post by a hair-pin retainer 183.

An adjustment lever 152 having a vertically bored boss 153 is adapted, by said boss, to be snugly telescoped onto the block hub 181, and to be secured to said hub by set screws passed through the opposite threaded apertures 158 of the bored boss walls to clampingly engage lateral surfaces of the block hub 181.

A carrier 140 is slidingly mounted in the inwardly directed slots of four rectangularly disposed lateral extensions of the block 181, by a pair of laterally interspaced parallel arms of a U-shaped slide carrier 140, which arms are forwardly interconnected by a yoke portion 150 of the carrier slide, 140.

As best shown in Fig. 4 a pair of laterally interspaced upstanding journal posts 135' and 136' are mounted near the corners 160 and 161 of the yoke portion 150, of the U-shaped slide carrier 140, and the idler pulleys 135 and 36 are respectively telescoped, by their longitudinal bores, on said posts 135' and 136', and retained thereon by spring retainers 162 and 163, respectively.

A spring 173 is secured by one end to a pin 172 carried by a relatively forward part of the block 170, and its opposite end is conveniently secured to an upstanding pin 174 secured to a free end of one of the arms of the U-shaped carrier slide 140, and is effective to resiliently bias the pulley-carrying slide forwardly, while said pin, by engagement with a rear edge of the block 170, limits forward movement of the slide.

In the following description it will be assumed that the motor shaft 133 is rotated at such a speed relative to the relative diameters of the upper and lower pulley portions of the pulleys 135 and 36, that with said pulleys successively engaged by said respective upper and lower portions with the wheel tread 17 and the shaft pulley 133, the wheel 110 will drive the turntable at successively different rotational speeds of 78 R. P. M. and 33 R. P. M. respectively.

It will, however, be understood that by varying the relative diameters of the upper and lower pulley portions of either of said pulleys 135 and 36, a considerably different resultant rotational speed of the turntable may be effected, as will be clear from the following, relating to different adjustment positions of the lever 152.

In the operative position of parts shown in Fig. 1 the shift lever 152 has been placed in a laterally swung position which by way of example, is marked "33⅓." At this position the lever 152 has swung the slide holder 170 to the position shown, wherein the pulley portion 137 of the pulley 36, which is disposed at the relatively low level of the shaft pulley 133, is brought into frictional peripheral engagement with the motor shaft 133, while its uppermost pulley portion which is of relatively lesser diameter has, by the same adjustment movement of the lever 152, been brought into engagement with the tread surface of the friction wheel 110.

Therefore the said wheel is so driven by said pulley portion 136, that the turntable flange 15a which is disposed in driving engagement with the tread 17 of the wheel 110 is resultantly driven by the wheel to cause it to rotate at the assumed desired rotational rate of 33⅓ R. P. M.

Figure 2:
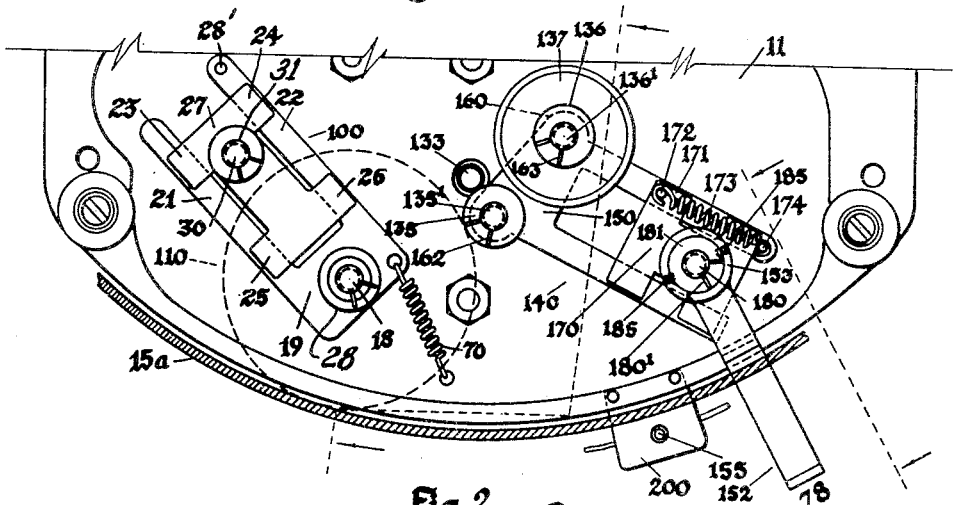
Fig. 2 is a somewhat abbreviated view of the general nature of that in Fig. 1, of said embodiment, operative parts of the mechanism being shown in positions assumed thereby during a relatively different adjustment position of an adjustment lever, thereof.

When the handle 152 is then moved to the relatively different position shown in Fig. 2, wherein it is disposed adjacent to the designation "78," the slide holder 170 has been resultantly, so swung by the lever 152, in the clockwise direction, as to have removed the lowermost pulley portion 137 of the pulley 36 from engagement with the motor shaft pulley portions 133, and to have concurrently disengaged the upper pulley portion 136 thereof from the tread of the wheel 110, by the above same swinging movement of the lever 152, the pulley 135 has been caused to engage, by its uppermost portion 135a, and by its lowermost preferably rubber tread portion 135b, respectively, with the idler wheel tread and the pulley portion 133 of the motor shaft, respectively, as shown.

In the position which the parts assume when the lever 152 is further moved in the same clockwise direction to the position shown in Fig. 3, the slide holder 170 has been so swung that both of the pulleys 135 and 136 are moved entirely out of contact with the tread of the friction wheel 110, and also out of contact with the motor shaft 133, and at this time, the outwardly projecting portion of the shift lever 152 is caused to engage and depress the switch button 155, to operate the switch to interrupt the energizing circuit of the motor which is thus rendered inactive during the above described neutral, inoperative, "off" adjustment position of the described parts.

In moving either of the lowermost pulley portions 137 and 135b respectively of the pulleys 136 and 135, from their successively described positions of engagement with the motor shaft pulley 133, each of the said lowermost pulley portions 137 and 135b ride over said pulley 133 and are cammed thereby to cause the pulley-carrying slide 140 to retract on the holder 170 against the pressure of the yieldable spring 173 until both of said pulleys 136 and 135 are swung clockwise, beyond the shaft pulley 133.

At a time when either or both of the lowermost portions 135b of the pulley 135, and the lowermost portion 137 of the pulley 136, are preliminarily disposed, in the clockwise direction, beyond the position of the shaft pulley 133, any such inoperatively positioned pulley may be restored to the illustrated operative position therefor, which for the respective pulleys 136 and 137, are respectively shown in Figs. 1 and 2, by rotating the lever in the counter-clockwise direction to either the position shown in Fig. 2, or the position shown in Fig. 1, to respectively effect driving of the turntable at the exemplary speeds of 78 R. P. M. or 33⅓ R. P. M. respectively. During such counter-clockwise adjustment movement, the lower pulley portion of any such inoperatively placed pulley will again ride over the shaft pulley 133, which again deflects it, to its illustrated operative position with respect thereto.

During such times as the drive wheel 110 is peripherally engaged with the upper pulley portion of either of the pulleys 135 or 36, said wheel is deflected laterally against the opposing pressure of the spring 70 which yieldably maintains any such engagement.

The relative positioning of the axis of one of the idler pulleys 135, or 36, with respect to the axis of the shaft 133 and with the axis of the wheel 110, is preferably such that lines extending from said idler pulley axis to said shaft and wheel axes are divergent at an acute angle approaching a right angle and roughly approximating the relative angularity of the arms of a numeral, "7."

Also when the upper and lower pulley portions of either pulley 135 or 136 are respectively adjustably engaged with the wheel tread 17 and the shaft pulley portion 133, or being swung over said tread and shaft portion, the spring 173 will yieldably permit retraction of the pulleys and slide 140.

The spring 173 is effective, in operative adjustment positions of either pulley 135 or 136, to maintain pressure engagement of the lower portions of any selected one of said pulleys with said shaft pulley portion.

Although I have described my invention in one preferred embodiment thereof, I am aware that numerous and extensive departures may be made therefrom, without, however, departing from the spirit of my invention and the scope of the appended claims.

What I claim is:

1. A selective plural speed friction drive mechanism for phonograph turntables having an annular flange, comprising a vertical motor shaft affording a pulley end portion, a plurality of relatively laterally disposed friction drive pulley elements, movable mount means adapting said elements for lateral shifting movement, a wheel having a friction tread and a movable mount therefor adapting it for lateral movements, said wheel being so disposable as to effect engagement of its tread with a phonograph turntable flange, each of said elements having an upper and a lower pulley portion which are respectively disposed at the levels of said tread and said shaft pulley portion, the ratio of relative diameters of said pulley portions, in the case of different of said elements, being substantially different, adjustment means having an actuating member adapted to be adjustably moved from and to, different relatively interspaced stations located in a path of movement which is of like directional nature throughout, said mount means for said elements being so laterally movable, in response to station-to-station adjustment movements of said actuating member, as to effect disengagement from said wheel tread and from said shaft portion, of the upper and lower pulley portions, respectively, of any one of said elements whose said portions have been, respectively, previously engaged therewith, and in response to the same adjustment movement of said member, said mount means being so disposed as to effect engagement of the respective upper and lower pulley portions of another of said elements with said wheel tread and said shaft pulley portion respectively, spring means adapted to yieldably apply a laterally directed resilient effort tending to maintain said wheel tread in engagement with an upper pulley portion of an operatively positioned one of said elements, and concurrently adapted to yieldably oppose lateral displacement of said wheel, by the effect of the engagement of its tread with any said thereby engaged turntable flange.

2. A plural-speed friction drive mechanism for driving a phonograph turntable of the type having an annular flange, comprising a friction wheel having a tread of rubber or like material, a laterally movable mount affording a journal on which said wheel may rotate on a vertical axis, at least two friction pulley elements, a rotatable motor shaft having a pulley portion disposed at a lower level than said wheel tread, said elements each provided with relatively upper and lower coaxial pulley portions which in the case of different of said elements are in diametrically different ratios to each other, and which upper and lower portions are respectively disposed at the respective levels of said wheel tread and said shaft portion, a common mount upon which said elements are journalled in laterally interspaced relation, said common mount adapted for movement to alternate adjustment positions in respective of which a different of said elements is disposed in an operative position wherein its said upper portion is frictionally engaged with said wheel tread, and wherein its said lower portion is frictionally engaged with said shaft pulley portion, a frame upon which said shaft, wheel and elements are secured in unitary relation, said wheel being so disposed on said frame that said frame may be so disposed with reference to a phonograph turntable as to place the wheel tread in driving engagement with a lateral surface of an annular flange of a turntable, and spring means exerting resilient laterally directed efforts on said mounts, to resiliently maintain the respective portions of an operatively positioned element in concurrent frictional engagement with said wheel tread and with said shaft pulley portion respectively, and to resiliently resist displacement of said wheel tread from engagement with an associated turntable flange.

3. A plural-speed friction drive mechanism for phonograph turntables of the type having a pendant annular flange, a vertically extending motor drive shaft affording a pulley portion disposed at a first level, a wheel having a cushion friction tread disposed at a higher second level, a laterally movable mount upon which said wheel is journalled for rotation about a vertical axis, a lever having an actuator portion adapted to be oppositely laterally swung in an arcuate path of movement to any of a plurality of stations in said path, a laterally movable carrier, a plurality of idler pulley elements, each separately journalled in relatively interspaced relation to each other on said carrier, each of said elements having an upper and a lower pulley portion the diametrical ratio between which being different in the case of different of said elements, said portions being respectively disposed at said second and said first levels, said carrier being laterally movable in response to successive station-to-station movements of said lever in the same direction to processionally move said pulley elements to effect sequential operative engagement concurrently by the respective upper and lower portions of each with said wheel tread and said shaft pulley portion, spring means adapted to resiliently yieldably maintain such operative engagement with respect to the said portions of any such engaged one of said elements, and a frame to which said shaft, wheel mount, carrier and lever are unitarily with said wheel tread so disposed as to be engageable with a lateral surface of a turntable flange to drive the turntable.

4. The friction drive mechanism substantially as set forth in claim 3 wherein said spring means comprises a pair of springs, a first thereof being so disposed to exert a resilient effort on said wheel mount as to cause said wheel tread to be maintained in engagement with said upper portion of a pulley element disposed in the recited operative position, the second of said springs being so disposed to exert a resilient effort to yieldably maintain the said lower portion of an operatively positioned pulley element in engagement with said shaft pulley portion.

5. A plural-speed frictional drive mechanism for driving a phonograph turntable of the type having an annular flange at selectively different speeds, comprising a frame unitarily carrying all parts of the mechanism, said parts comprising a final drive wheel having a cushioning friction tread, a vertically extending rotatable motor power shaft affording a friction drive pulley portion disposed at a lower level than that of said wheel tread, a plurality of idler pulleys, each thereof having an upper and a relatively lower co-axial pulley portion, said upper and lower idler pulley portions being respectively disposed at the respective levels of said wheel tread and of said shaft pulley portion, the ratio of diameters as between said portions of any of said pulleys, being different from the diametrical ratio between corresponding portions of any other of said pulleys, said frame being adapted for disposition to effect peripheral frictional driving engagement between said wheel tread and a turntable flange, said pulleys, said shaft pulley portion, and said wheel being rotatable on parallel axes, laterally movable mount means for said wheel, a common laterally movable carrier for all of said pulleys, said carrier adapted for lateral movements to at least a pair of operative adjustment positions in different of which the upper and lower portions of a different of said idler pulley are respectively frictionally engaged respectively with said wheel tread and with said drive shaft pulley portion, an adjustment member adjustably movable from either of a pair of relatively interspaced stations, located in a path of movement of uniformly like nature throughout, to the other of said stations, said carrier being movable in response to either of such movements of said member, to disengage the said pulley portions of one of said pulleys from their said respectively engaged wheel tread and shaft pulley portion, and in response to the same station-to-station movement of said member, the said carrier being so moved as to engage the respective upper and lower pulley portions of another of said pulleys, respectively with said wheel tread and said shaft pulley portion, and spring means yieldably constraining said wheel and any operatively positioned pulley to their respective operative adjustment positions wherein said operatively positioned pulley is frictionally engaged by said shaft pulley portion and by said wheel tread, and the wheel tread is restrained from disengagement from a relatively engaged turntable flange.

6. A plural-speed friction drive mechanism for driving a phonograph turntable, having an annular flange, at different speeds, comprising a vertical motor shaft having an upper pulley portion, a final drive wheel having a friction tread which is disposed at a higher level than said shaft pulley portion, and being adapted to be peripherally engaged with a flange of a turntable, a laterally movable mount affording a journal upon which said wheel is rotatable about a vertical axis, a laterally adjustable pulley carrier, a plurality of idler pulley elements journalled in interspaced relation on said carrier for rotation, each on a vertical axes, each of said idler elements having relatively upper and lower pulley portions, the relative diameters of the said pulley portions of different of said idler elements being substantially different, said upper and lower idler element portions being respectively disposed at the level of said wheel tread and at the level of said shaft pulley portion, spring means biasing said wheel mount to yieldably force said wheel tread toward said elements, and said carrier being adjustably movable to different successive stations in a path of movement to dispose different of said elements in an operative position in response to positioning of said carrier at the different stations, and each said operatively positioned element being in engagement by its upper portion with said wheel tread, and by its lower portion with said shaft pulley portion.

7. The transmission mechanism for driving phonograph turntables of the pendant annular flanged type, comprising a friction wheel, a plurality of pulleys, and a motor shaft affording a pulley surface, said wheel, said pulleys, and said shaft journalled to rotate on vertical axes, said wheel being disposable in peripheral frictional engagement with an inner surface of a turntable flange, each of said pulleys having an upper and a relatively co-axial lower pulley portion, adapted to be interchangeably selectively interposed between, and in concurrent peripheral engagement by its respective upper and lower portions, with said wheel and said shaft pulley surface, the relative diameters of the said upper and lower pulley portion for different of said pulleys being in different ratios, and manually operable adjustment means adapted for differing adjustment movements, to selectively interpose any of said pulleys in its operative position wherein its said upper and lower pulley portion is frictionally engaged respectively with the periphery of said wheel, and with the pulley surface of said shaft.

8. A plural-speed friction drive mechanism for peripherally flanged phonograph turntables, comprising a final drive wheel having a friction tread adapted for engagement with a turntable flange, a laterally movable mount affording an upstanding journal post for said wheel, a spring so located and so applied to said wheel mount as to tend to retractively roll the wheel tread on an engaged turntable flange, a laterally shiftable support and a plurality of laterally interspaced upstanding journal posts thereon, a vertical motor shaft having a pulley portion disposed at a lower level than the level of said wheel tread, a plurality of pulley elements, each having an upper and a lower pulley portion, different of said elements journalled on different posts of said support, the ratio of diameters of the respective upper and lower portions in the case of different of said elements, being different, said support being adjustably laterally movable in either of two opposite directions to different adjustment positions to selectively dispose of any of said elements in an operative position whereby its lower pulley portion is frictionally engaged with said shaft pulley portion, and whereby concurrently an upper pulley portion thereof is frictionally engaged with said wheel tread, and a second spring associated with said pulley support and yieldably urging said support in a direction lateral to its direction of movement to resiliently maintain the said lower pulley portion of an operatively positioned pulley element in frictional engagement with said shaft pulley portion, and said wheel tread being concurrently resiliently maintained in engagement with the upper pulley portion of the same element.

9. A motor transmission mechanism for selectively driving a phonograph turntable having an annular flange, at substantially different rotational speeds, of the type wherein a rotatable wheel is adapted to frictionally communicate driving motion from a motor drive shaft to said turntable flange, comprising in combination with said wheel and a driving end portion of said shaft, a plurality of rotatable idler pulley elements adapted to be interchangeably interpositioned between said shaft and said wheel, said pulley elements each having an upper and a lower pulley portion and said wheel and a driving portion of said shaft being respectively disposed at the respective levels of said upper and lower pulley portions, a manually adjustable member movable to at least two different adjustment positions, means operable, in response to movement of said member to different of said adjustment positions, to shift the lateral position of said rotatable idler pulley elements with respect to said wheel and to said shaft, to frictionally engage either pulley element, by its relatively upper and lower pulley portions, with said wheel and said shaft pulley portion, at least one of said rotatable idler pulley elements being of such stepped form as to cause its said upper and lower portions to be of relatively different diameters, whereby when said stepped pulley element is operatively engaged by its said upper and lower portions with said wheel and said shaft pulley portion, in substitution for engagement thereof by the upper and lower portions of another said pulley element, said wheel is caused to rotate at a different rotational rate.

10. The transmission mechanism substantially as set forth in claim 8, characterized by said wheel being provided with a peripheral facing of yieldable friction material and the lower pulley portion of each of the idler pulley elements which is adapted for engagement with said driving shaft pulley portion being also peripherally faced with yieldable friction material.

11. The transmission mechanism substantially as set forth in claim 9, characterized by the provision of carrier means, said rotatable pulley elements being separately journalled on said carrier means, and said adjustment means adapted to selectively move said carrier means to interchangeably position any of said rotatable idler pulley elements in its said operative position.

12. The mechanism substantially as set forth in claim 6, characterized by the recited upper portion of each said upper portion of said pulley elements having a smooth friction surface, said wheel and the lower portions of said pulley portions being each peripherally faced with rubber or other slightly compressible material.

13. A friction drive mechanism for peripheral flanged phonograph turntables comprising a final drive friction wheel rotatable on a vertical axis engageable with a turntable flange, a vertically extending motor shaft affording a drive pulley portion, a plurality of idler pulley elements, each having upper and lower pulley portions in diametrically different ratios from any other thereof, a laterally movable mount on which said idler pulleys are journalled in relatively interposed parallel relation, said respective upper and lower idler pulley portions of each element being disposed at the respective levels of peripheral portions of said wheel and shaft, and the respective said portions of said element being, interchangeably, respectively engageable with peripheral portions of said wheel and of said drive shaft pulley portion, in response to lateral positioning of said mount in different laterally adjustable positions, an adjustably swingable carrier member on which said mount is slidably carried, and spring means exerting a resilient effort on said mount to so slidably move it on said carrier, to yieldably urge the lower pulley portion of any said idler pulley which has been disposed for engagement of its lower portion with said drive pulley portion, to effect and maintain pressure engagement of said lower pulley portion, with said drive pulley.

FRANK M. SLOUGH.

REFERENCES CITED

The following references are of record in the file of this patent:

UNITED STATES PATENTS

| Number | Name | Date |
| --- | --- | --- |
| 1,870,421 | Proug | Aug. 9, 1932 |
| 2,200,574 | Davis | May 14, 1940 |
| 2,221,661 | Woolf | Nov. 12, 1940 |

FOREIGN PATENTS

| Number | Country | Date |
| --- | --- | --- |
| 408,973 | Germany | Jan. 27, 1925 |